(12) United States Patent
Jiao et al.

(10) Patent No.: US 12,504,381 B2
(45) Date of Patent: Dec. 23, 2025

(54) PROCESSING DEVICE AND INSPECTION APPARATUS FOR OPTICAL INSPECTION AND CORRESPONDING METHODS

(71) Applicant: LEICA MICROSYSTEMS (SUZHOU) TECHNOLOGY CO., LTD., Suzhou (CN)

(72) Inventors: Linqi Jiao, Suzhou (CN); ChunXin Yang, Suzhou (CN); Fei Zhang, Suzhou (CN); Yuanping Zhou, Suzhou (CN); Minquan Li, Suzhou (CN); Wei Zhao, Suzhou (CN); Shengwei Feng, Suzhou (CN)

(73) Assignee: LEICA MICROSYSTEMS (SUZHOU) TECHNOLOGY CO., LTD., Suzhou (CN)

( * ) Notice: Subject to any disclaimer, the term of this patent is extended or adjusted under 35 U.S.C. 154(b) by 202 days.

(21) Appl. No.: 18/548,229

(22) PCT Filed: Mar. 1, 2021

(86) PCT No.: PCT/CN2021/078530
§ 371 (c)(1),
(2) Date: Aug. 29, 2023

(87) PCT Pub. No.: WO2022/183340
PCT Pub. Date: Sep. 9, 2022

(65) Prior Publication Data
US 2024/0133823 A1  Apr. 25, 2024
US 2024/0230550 A9  Jul. 11, 2024

(51) Int. Cl.
*G01N 21/01* (2006.01)
*G01N 21/17* (2006.01)
*G01N 21/88* (2006.01)

(52) U.S. Cl.
CPC ......... *G01N 21/8803* (2013.01); *G01N 21/01* (2013.01); *G01N 21/17* (2013.01);
(Continued)

(58) Field of Classification Search
CPC .... G01N 21/8803; G01N 21/01; G01N 21/17; G01N 2021/0181; G01N 2021/1765;
(Continued)

(56) References Cited

U.S. PATENT DOCUMENTS 7,535,561 B2 *  5/2009  Chikamatsu ....... G01N 21/9501
                                                    356/237.4
8,300,284 B2 * 10/2012  Sowul ..................... G01V 8/20
                                                    356/141.5
(Continued)

FOREIGN PATENT DOCUMENTS

CN    111524132 A     8/2020
DE    102014106233 A1 11/2015
(Continued)

OTHER PUBLICATIONS

Olympus Corporation; "Maßgeschneiderte Lösungen für die Fertigungsindustrie und industrielle Forschung"; *Bidanalyse-Software—Olympus Stream—Version 2.4.2*; Jun. 1, 2019; pp. 1-20; XP093219161; [Online] Retrieved from internet: URL:https://www.olympus-ims.com/en/.downloads/download/?file=285213239&fl=de_DE; Olympus Corporation; Tokyo, Japan.

(Continued)

*Primary Examiner* — Isiaka O Akanbi
(74) *Attorney, Agent, or Firm* — LEYDIG, VOIT & MAYER, LTD.

(57) ABSTRACT

A processing device to be used for optical inspection of samples is configured to be communicatively coupled to a camera of an optical inspection device and to a user interface, to receive input data from the user interface and/or
(Continued)

from the camera, to provide output data to the user interface, to be communicatively coupled to a storage device, to provide instructions, by accessing instruction data stored at the storage device, for optical quality inspection of samples to be performed by a user via the user interface. The instructions include instructions regarding what kind of optical quality inspection to be performed on which sample. The processing device is further configured to receive quality report data from the optical quality inspection via the user interface, and/or image data of images acquired by the camera, and to store the quality report data and/or the image data in the storage device.

9 Claims, 3 Drawing Sheets

(52) U.S. Cl.
CPC ........... *G01N 2021/0181* (2013.01); *G01N 2021/1765* (2013.01); *G01N 2201/1266* (2013.01)

(58) Field of Classification Search
CPC ........ G01N 2201/1266; G06T 2200/24; G06T 2207/10056; G06T 2207/30164; G06T 7/001
USPC .......................... 356/237.2–237.6, 610–630

See application file for complete search history.

(56) References Cited

U.S. PATENT DOCUMENTS

| | | | | |
|---|---|---|---|---|
| 8,630,019 | B2* | 1/2014 | Tsujii | G06F 3/1242 |
| | | | | 358/1.9 |
| 2004/0070753 | A1* | 4/2004 | Sugihara | G01N 21/95607 |
| | | | | 250/306 |
| 2007/0124713 | A1 | 5/2007 | Ando et al. | |
| 2008/0073533 | A1* | 3/2008 | Makino | H01J 37/29 |
| | | | | 250/310 |
| 2009/0185178 | A1* | 7/2009 | Miyoshi | G01N 21/9501 |
| | | | | 356/237.5 |
| 2012/0120224 | A1* | 5/2012 | Zuest | G02B 21/368 |
| | | | | 348/79 |
| 2015/0144804 | A1 | 5/2015 | Ando et al. | |
| 2018/0284623 | A1 | 10/2018 | Tel et al. | |
| 2022/0215548 | A1 | 7/2022 | Cai et al. | |
| 2024/0273614 | A1* | 8/2024 | Espel-Logan | G06V 20/41 |

FOREIGN PATENT DOCUMENTS

JP     2017/032340 A     2/2017
WO    WO 2020/182088 A1  9/2020

OTHER PUBLICATIONS

Carl Zeiss Microscopy GMBH; "Zeiss Zen core v3.2"; *Software Manual*; Dec. 1, 2020; pp. 1-397; Rev. 1, en-US; XP093219322; [Online] Retrieved from internet: URL:https://files.pulchlorenz.de/software/EN_operation-manual_ZEN-core-v3.2-Software-Manual-p1.pdf; Pulch + Lorenz microscopy; March, Germany.

European Patent Office; Supplementary European Search Report; EP Application No. 21928431; Nov. 18, 2024; pp. 1-11; Munich, Germany.

\* cited by examiner

PROCESSING DEVICE AND INSPECTION APPARATUS FOR OPTICAL INSPECTION AND CORRESPONDING METHODS

CROSS REFERENCE TO RELATED APPLICATIONS

This application is a U.S. National Phase application under 35 U.S.C. § 371 of International Application No. PCT/CN2021/078530, filed on Mar. 1, 2021. The International Application was published in English on Sep. 9, 2022 as WO 2022/183340 A1 under PCT Article 21(2).

FIELD

Embodiments of the present invention relate to a processing device to be used in an inspection apparatus for optical inspection of samples, to such an inspection apparatus and to methods for performing optical quality inspection of samples, for setting up an inspection apparatus and for operating such a processing device.

BACKGROUND

Optical inspection of subjects or samples is applied in different technical fields. For example, in medical technology, components like stents need to be checked for specific quality requirements before their final use. Such quality inspection might be performed by eye or by using magnifying instruments like microscopes. Any results of the inspections like "pass" or "fail" can be noted by hand or, e.g., in simple digital sheets.

SUMMARY

Embodiments of the present invention provide a processing device to be used in an inspection apparatus for optical inspection of samples. The processing device is configured to be communicatively coupled to a camera of an optical inspection device, to be communicatively coupled to a user interface comprising a display device, to receive input data from the user interface and/or from the camera, to provide output data to the user interface, to be communicatively coupled to a storage device and to access the storage device to store and retrieve data, to provide, by accessing instruction data stored at the storage device, instructions for optical quality inspection of samples to be performed by a user, via the user interface, such that the instructions are provided as the output data to the user interface. The instructions include pre-defined instructions for the user regarding what kind of optical quality inspection to be performed on which sample. The processing device is further configured to receive quality report data from the optical quality inspection via the user interface, and/or image data of images acquired by the camera as the input data, and to store the quality report data and/or the image data in the storage device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention relate to inspection apparatuses for optical inspections (in particular optical quality inspection) of samples, processing devices to be used with or in such apparatuses, and also to methods for performing optical quality inspection of samples, of setting up such inspection apparatus, and of operating such processing device. Such samples can comprise medical components or parts like stents, medical screws and the like. However, also different kinds of samples might be inspected, of course. Such inspection apparatus comprises optical inspection means (or an optical inspection device), user interface means or devices, and a processing device. The optical inspection means comprise a camera (i.e. an image acquisition means) and, preferably, also a microscope a user can use for detailed inspection and magnification of a sample. The user interface means comprise display means like a monitor (display) and, preferably, also user input means or devices like a keyboard and/or a computer mouse. Also, the user interface means can comprise a touch display which then forms a combination of a display means and a user input means.

The camera can be combined with the microscope and also with the user interface means or at least part of it. For example, the camera can be attached to the microscope to allow (live) imaging of the sample via the microscope. Further, the display means might be integrated into the microscope (i.e., the display means as part of the user interface means is then also part of the optical inspection mans) such that content visualized on the display means is coupled in the optical path of the microscope.

The processing device is a computing unit that is communicatively coupled to the user interface means (including the display means) and also to the camera. This allows receiving input data from the user interface means and from the camera, and providing output data to the user interface means, in particular the display means. In this way, operation can be controlled by the processing device. Note that the processing device can comprise individual communication interfaces for connecting each of the respective components; however, also several components can be connected to a common interface of the processing device. For example, individual USB interfaces can be provided for the camera, for a keyboard and for a computer mouse (keyboard and computer mouse can, of course, also be connected to a common USB interface). A HDMI interface can be provided for a display.

Preferably, storage means are provided on which data like instructions for a user to be performed for optical quality inspections can be stored. Also, data acquired during such optical quality inspection (quality report data) can be stored thereon. Such storage means can also be connected or communicatively coupled to the processing device, e.g., via an interface. In general, different kinds of storage means can be used, like a folder based data storage and/or a database server.

Consequently, the processing device is configured to be communicatively coupled (connected) to a camera of optical inspection means, to be communicatively coupled to user interface means comprising display means, to receive input data from the user interface means and/or from the camera, to provide output data to the user interface means, and to be communicatively coupled to storage means and to access the storage means to store and retrieve data, In order to facilitate optical inspection of samples and ensure sufficient quality of the samples, specific instructions for the user can be provided, in particular including kind of a workflow with different steps of inspection to perform on a sample. According to embodiments of the present invention, instruction data including such instructions for optical quality inspection of samples to be performed by a user are stored on or at the storage means. The processing device then accesses these instruction data and provides the instructions for optical quality inspection of samples to be performed, via the user interface means, such that the instructions are provided as output data to the user interface means. These instructions include pre-defined instructions for the user regarding what kind of optical quality inspection to be performed on which sample. As mentioned above, there might be different steps in a workflow with different instructions. For more details on such instructions, it is referred to the Figures and the corresponding description.

The user performing optical quality inspection of a sample, then needs to acquire (in particular according to the instructions) different data about the sample like measures, defects and also might be required to acquire images of the sample, in particular by means of the camera of the optical inspection means. Thus, the user needs to establish a kind of quality report. Data referring to such quality report, also called quality report data in the following, is then created by the user using the user interface means and sent to the processing device in order to store in at the storage means. Thus, the processing device receives quality report data from optical quality inspections via the user interface. Also, the processing device can receive image data of images acquired by the camera as input data. The processing device then stores the quality report data and/or image data in the storage means.

This allows optical quality inspection of samples by a user strictly following pre-defined instructions, these instructions being stored, for example, in a central storage means. Defining these instructions will be explained in more detail later. Also, all quality reports or quality report data will be stored in the same place, thus, allowing central access to all quality reports. In particular, several of these inspection apparatuses (or the respective processing devices) can be connected to the same storage means and thus all are provided with the same instructions and allow storing all quality reports at the same place.

Preferably, the instructions further include at least one pre-defined overlay to be displayed by the display means, such that the overlay is virtually overlaid a sample currently viewed by the optical inspection means and/or via the display means (e.g., directly by an eyepiece of the microscope with the overlay coupled into the optical path, or indirectly as a live image of the sample, captured by the camera and displayed on the monitor, with the overlay also presented on the monitor). The overlay is to be used by the user to perform specific optical quality inspections on the sample. Such overlay can include, for example, shapes the sample can have or areas within which the shapes of the sample need to be. In particular, the camera is controlled by the processing device to acquire a live image of the sample currently viewed; the display means is controlled to display the live image and the overlay such that the overlay is virtually overlaid to the live image.

Preferably, the live image of the sample currently viewed and the overlay are matched. This allows, in particular, determining quality characteristics based on differences between corresponding geometric measures of the overlay and the live image of the sample. The quality report can then, in particular, include a pass or fail note determined based on the quality characteristics. The use of such overlay allows fast and efficient optical quality inspection of samples since the user or operator performing the inspection is supported by (automatedly) displayed requirements the sample needs to fulfill (specific measures, shapes and the like). While matching of the overlay and the sample may be performed by the user (by, e.g., positioning the sample in relation to the overlay), such matching can also be performed automatically by means of the processing device. This may include, for example, image analysis of the live image of the sample with detecting edges of the sample in the live image and orienting the overlay accordingly.

Embodiments of the invention also relate to a method for setting up such inspection apparatus. Besides coupling or connecting the processing device to the respective components and means and configuring the processing device accordingly, as mentioned before, such setting up also includes creating the instruction data that includes the instructions for optical quality inspection of samples to be performed by a user, and storing the instruction data in the storage means. This creating comprises defining instructions for the user regarding what kind of quality inspection to be performed on which sample, regarding which quality reports to be made, and regarding which images to be acquired from the sample.

Preferably, the instruction data and the instructions comprised therein are not defined by the user or operator to perform the optical quality inspection, but by another person like a (quality) manager who is aware of all data that has necessarily be obtained during such quality inspection from a specific sample or kind of sample. Besides, the quality reports of several samples also can be obtained from the storage means by, e.g., the (quality) manager and be checked and/or approved; then a batch report might be created. A further overview of such optical quality inspection procedure is shown in the Figures.

In addition, it is to be noted that each of the processing devices can be configured such that it allows performing some or all of the tasks provided by the integrated processing means of the camera (kind of smart or intelligent camera) disclosed in document WO 2020/182088 A1, which refers to a digital microscope camera and a microscope with such a camera that allows imaging samples. In contrast to such smart camera, the processing device according to embodiments of the present invention is a device provided separately from the camera and, thus, can be used in combination with different cameras as per the user's or costumer's needs.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

Figure 1:
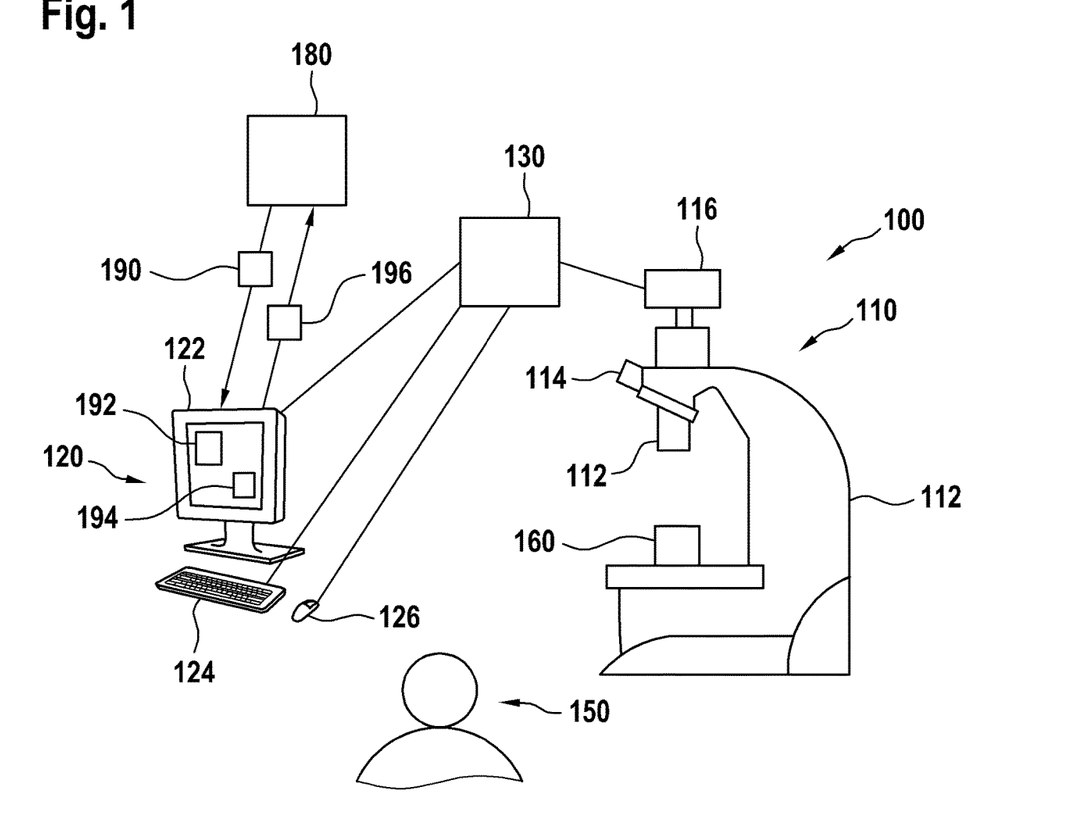
FIG. 1 shows a schematic overview of an inspection apparatus according to an embodiment.

FIG. 1 illustrates a schematic overview of an inspection apparatus 100 according to an embodiment of the invention. The inspection apparatus 100 comprises optical inspection means 110, user interface means 120, and a processing device 130. The optical inspection means 110 comprise a microscope 112, having an objective 112 and an eyepiece 114, and a camera 116. By means of example, the camera 116 is coupled to the microscope 112 separately from the eyepiece 114 such that a user or operate 150 can view or optically inspect a sample 160 via the eyepiece 114 and, at the same time, a live image of the sample 160 can be acquired by the camera 116. The camera 116 is communicatively coupled to the processing device 130. The processing device 130 might be mounted to the microscope by means of a mounting bracket, if required.

The user interface means 120 comprise display means 122, in the form of a monitor or display, and a keyboard 124 and a computer mouse 126 as input means. Each of these components means 122, keyboard 124 and a computer mouse 126, is connected (communicatively coupled) to the processing device 130. Thus, a user can view or optically inspect the sample also via the display means. Also, the separate eyepiece can be omitted.

In addition, storage means 180 are connected to the processing device 130, e.g., via Ethernet or Internet. The storage means can provide a folder based data storage for storing instruction data 190, quality report data 196 and images as mentioned before and as will be described in further detail below. Of course, also other or additional storage means like a server running a database may be used and connected to the processing device 130. By means of example, instructions 192 and a quality report 194 are shown on the display means 122.

Figure 2:
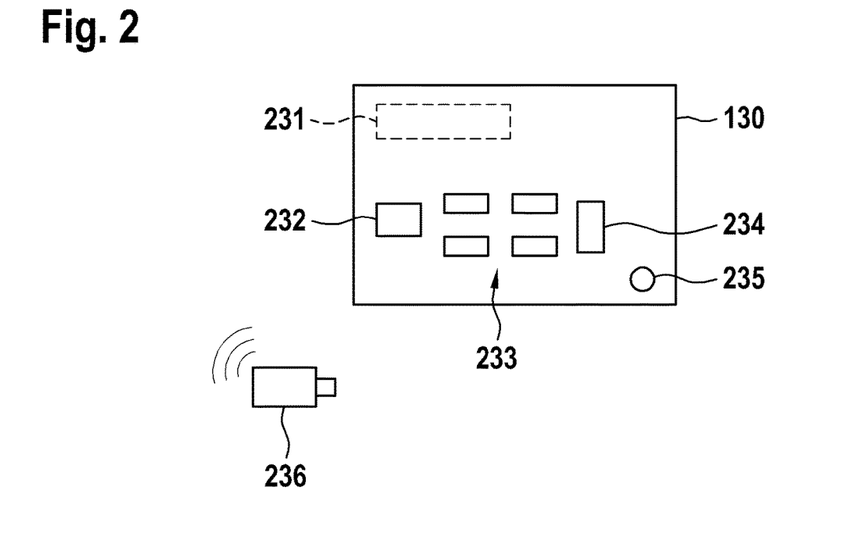
FIG. 2 shows a detailed view of a processing device being part of the inspection apparatus of FIG. 1 according to an embodiment.

FIG. 2 illustrates a more detailed view of the processing device 130 of FIG. 1, in particular a rear view. The processing device 130 comprises a processor (CPU) 231 and several (communication) interfaces or ports. By means of example, these interfaces comprise an Ethernet interface 232, four USB interfaces 233 (these might be of different kind, e.g., USB 3.0 and/or USB 2.0), and a HDMI interface 234. Further, a power supply socket 235 is provided. The Ethernet interface 232 can be used to connect the processing device 130 to a network, USB interfaces 232 can be used to connect the processing device 130 to the camera 116, the keyboard 124 and the computer mouse 126. The HDMI interface 234 can be used to connect the processing device 130 to the display means 122. In addition, a WIFI dongle 236 is illustrated which can be connected to one of the USB interfaces 233 in order to provide another network connection. Further components like a barcode scanner and/or a footswitch (which can be considered a user interface means) may be connected, if required. Also, further (mobile) storage devices may be connected. Note that these interfaces and their use for connections are only for illustration purposes.

Via the network, the processing device 130 can be connected to a storage means (see also remarks above) and/or to other processing devices of other inspection apparatuses.

Figure 3:
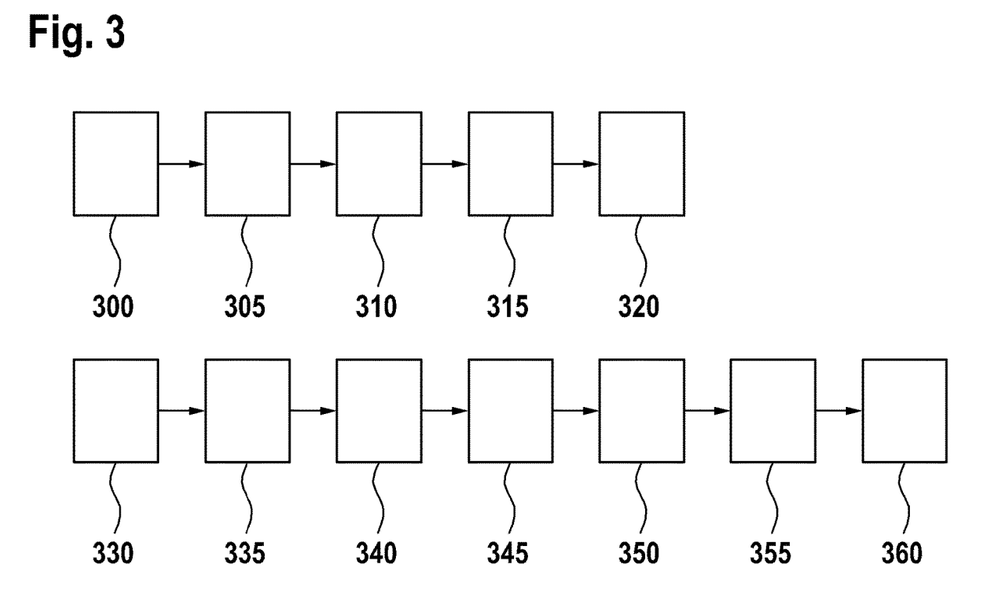
FIG. 3 shows, schematically, a flowchart describing a method according to an embodiment.

FIG. 3 illustrates an optical quality inspection procedure including setting up an inspection apparatus according to embodiments of the invention, with a specific focus on the instructions and quality reports. Steps 300 to 320 refer to setting up the inspection apparatus, i.e., the equipment used for inspection of samples. These steps include coupling (step 300) the processing device, communicatively to the user interface means and to the camera, coupling (step 305), the processing device, communicatively to the storage means, configuring (step 310), the processing device, to have access to the storage means to store and retrieve data, configuring (step 315), the processing device, to provide the instructions to a user upon request, and configuring (step 320), the processing device, to store quality report data and image data upon request during providing the instructions.

These steps basically are preparatory steps to be performed before starting any quality inspection. Note that the order of the steps does not necessarily needs to be the one shown and described. As mentioned above, the instruction data with instructions need to be created before inspection and stored on the storage means. This creation can take place within the following procedure, described with respect to steps 330 to 360.

In step 330, the instructions to be performed for a specific sample or kind of sample like a specific stent or the like are created. These instructions may be or include kind of a workflow or sequence of steps a user or operator needs to perform during optical quality inspection of such sample. These instructions are defined, for example, by a manager taking care of the overall procedure.

In step 335, these instructions are submitted, by the manager, to, for example, a quality manager in charge of quality control in general. In step 340, the quality manager checks the instructions for, e.g., quality relevant aspects. If the instructions fulfill the requirements, the quality manager approves the instructions. Otherwise, the instructions may be revised, i.e., step 330 is again performed. Approved instructions are stored, in the form of or included in instruction data on the storage means. Note that also in step 330, the instructions can be stored on the storage means and the quality manager, in step 340, accesses the instruction data to check and/or approve them. For example, only approved instructions are enabled for access by a user. For creating and/or checking/approving the instructions, an inspection apparatus can be used. However, also another computer connected to the storage means (e.g., via network) may be used.

In step 345, the optical quality inspection according to the previously defined instructions is performed by a user or operator for one or several samples, using the inspection apparatus. In this step, the instructions are provided to the user via the display means as described above. Further details on how such instructions might look like will be presented below. In step 350, the user submits a quality inspection report which is then, in the form of quality report data, stored on the storage means. Note that there may be different ways regarding how to create such quality report or the data. For example, the user can after each inspection step according to the workflow submit the results of the respective inspection step via the user interface and, after having finished the workflow for a specific sample, mark the report as finished. This means that the quality report data is repeatedly updated during the workflow. Steps 345 and 350 are repeated for each sample to be inspected.

Note that with several inspection apparatuses provided for several users, further quality reports can be created and stored on the storage means. Each user, however, can access the same instruction data, provided that all users inspect the same kind of sample. Of course, different instructions or workflows (with, e.g., different names) can be provided for different samples.

In step 355, the quality reports can be checked and approved by, e.g., the manager. From a number of quality reports, the manager can also create, in step 360, a batch report.

Note that different software applications (apps) may be provided on the a processing device, for example, a manager app for the manager (and quality manager) to define the different workflows and check the quality reports and the like and an operator app for a user to perform the optical quality inspection (for steps 345, 350 above). Also, user accounts might be set such that only users having an account can perform optical quality inspection. Also, different user accounts may be accorded different competences or access only to specific instructions for specific samples.

Figure 4:
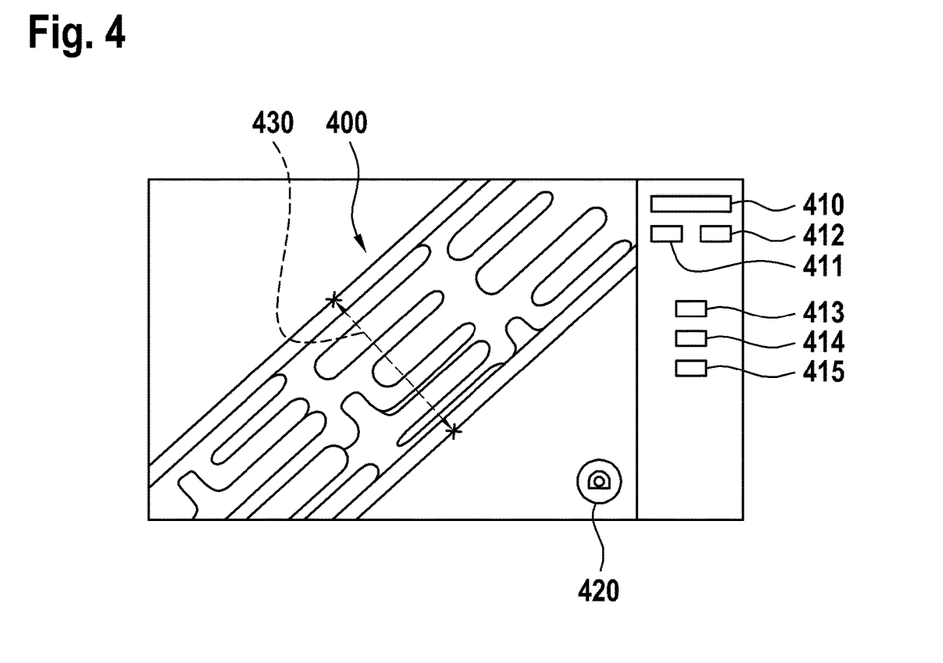
FIG. 4 shows, schematically, a step within an optical quality inspection according to an embodiment.

FIG. 4 illustrates, schematically, a step within an optical quality inspection according to an embodiment of the invention. Overall, FIG. 4 shows the content of a display or monitor of an inspection apparatus as described above during optical quality inspection of a sample. In this example, the sample is a stent, a (live) image 400 of which (the camera view) is presented at the display. As described above, the camera of the inspection apparatus may be used to acquire such live image.

On the right hand side of the display a menu bar including specific instruction text and/or (software) buttons 410 to 415 is presented. Such text/button may include: a (back) button to leave the workflow and return to the workflow selection screen; a list of inspection results, opening a detailed view of the inspection result; camera settings; user settings; number of steps; (next) button to continue with the next workflow step; (previous) button to return to the previous workflow step; detailed description of the task within the present workflow step. Note that the reference numerals 410 to 415 and the respective boxes are only used for illustration purposes and to not relate to real content, numbers or arrangement of such text/buttons.

Further, a camera button 420 is displayed within the camera view. Clicking onto this button 420 might cause the display of further options or camera options like: marking a defect in the camera image; performing a length measurement; performing an angle measurement; performing a radius measurement; adding a note to an image. Depending on the kind of action or option, a user might be able to set some markers by means of the computer mouse in the image/view and the corresponding measurement is automatically performed. By means of example, performing a length (or diameter) measurement is indicated with dashed line 430 and respective markers (indicated as crosses at the respective ends of the dashed line) in FIG. 4. After having finished the measurement, the user can save the measurement and, thus, creating quality report data (which is then part of an overall quality report, which includes further measurements and the like).

Another function can be taking an image of the current view of the sample, for example including the measurement markers and line shown in FIG. 4 such that the correct measurement can be checked later. Also, defects of the sample can be recorded in this way, for example, taking an image and adding a text note. Also, camera settings might be adjusted, if necessary, by using a respective button.

Such measuring using the camera and the live image typically requires calibration of the camera or its settings. This might be performed as an initial step of a workflow or whenever required. Such calibration can require taking a known measure like a measuring tape as the sample, performing a length measurement of such known measure as described above and setting that length in a calibration menu.

Figure 5:
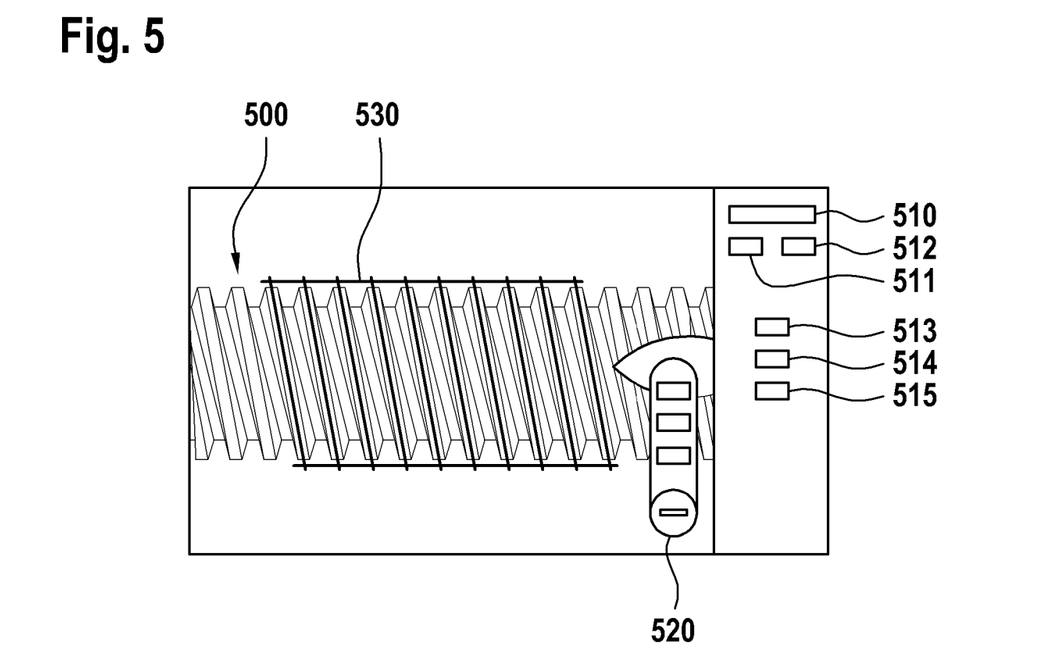
FIG. 5 shows, schematically, a step within an optical quality inspection according to an embodiment.

FIG. 5 illustrates, schematically, a step within an optical quality inspection according to an embodiment of the invention. Overall, FIG. 4 shows the content of a display or monitor of an inspection apparatus similar to FIG. 4, with a live image 500 of the sample. The sample in this example however is not a stent but a screw with thread.

On the right hand side of the display a menu bar including specific instruction text and/or (software) buttons 510 to 515 is presented. Such text/button may be similar to those shown in FIG. 4 with reference numerals 410 to 415. Also, button 520 might correspond to button 420 of FIG. 4, or to a save button after having clicked onto the camera button (see explanation above, the three boxes indicating further options or camera options as mentioned above), used to save the measurement or the like.

In this case, an overlay 530 is overlaid the sample currently viewed (or its live image, respectively). Such overlay can be created during creation of the overall instructions or workflow, as mentioned above. The overlay 530 in this example is a kind of net or grid including two parallel lines at the top and bottom and several further parallel lines, directing, from the top to the bottom, slightly to right side. Such overlay may be matched by the user or automatically with the live image 500.

In this example, the top and bottom line indicate a shape the outer edges of the sample can have. Also, any additional margin might be included. The almost vertical lines indicate a direction or course the thread of the sample can have. Depending on differences between the overlay and the real measures or geometry of the sample, the sample may be marked as pass or fail in the quality report.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 5. Alternatively, a microscope may be part of or connected to a system as described in connection with one or more of the FIGS. 1 to 5. FIG. 1 shows a schematic illustration of an inspection apparatus 100 (system) configured to perform a method described herein. The inspection apparatus 100 comprises a microscope 112 and a computer system 130 (processing device). The microscope 112 or inspection means 110 is configured to take images and is connected to the computer system 130. The computer system 130 is configured to execute at least a part of a method described herein. The computer system 130 may be configured to execute a machine learning algorithm. The computer system 130 and microscope 112 may be separate entities but can also be integrated together in one common housing. The computer system 130 may be part of a central processing system of the microscope 112 and/or the computer system 130 may be part of a subcomponent of the microscope 112, such as a sensor, an actor, a camera or an illumination unit, etc. of the microscope 112.

The computer system 130 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 130 may comprise any circuit or combination of circuits. In one embodiment, the computer system 130 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 130 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 130 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 130 may also include a display device, one or more speakers, and a keyboard and/or controller, which can include a mouse, trackball, touch screen, voice-recognition device, or any other device that permits a system user to input information into and receive information from the computer system 130.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention comprise a data carrier having electronically readable control signals, which are capable of cooperating with a programmable computer system, such that one of the methods described herein is performed.

Embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment of the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A processing device to be used in an inspection apparatus for optical inspection of samples, the processing device being configured to:
   be communicatively coupled to a camera of an optical inspection device,
   be communicatively coupled to a user interface comprising a display device,
   receive input data from the user interface and/or from the camera,
   provide output data to the user interface,
   be communicatively coupled to a storage device and to access the storage device to store and retrieve data,
   provide, by accessing instruction data stored at the storage device, instructions for optical quality inspection of samples to be performed by a user, via the user interface, such that the instructions are provided as the output data to the user interface, wherein the instructions include pre-defined instructions for the user regarding what kind of optical quality inspection to be performed on which sample, wherein the instructions further include at least one pre-defined overlay to be displayed by the display device, such that the overlay is virtually overlaid to a sample currently viewed by the optical inspection device and/or via the display device, and the overlay to be used by the user to perform specific optical quality inspections on the sample,
   control the camera to acquire a live image of the sample currently viewed,
   control the display device to display the live image and the overlay such that the overlay is virtually overlaid to the live image,
   match the live image of the sample currently viewed to the overlay,
   determine quality characteristics based on differences between corresponding geometric measures of the overlay and the live image of the sample, and
   receive quality report data from the optical quality inspection via the user interface, and/or image data of images acquired by the camera as the input data, and to store the quality report data and/or the image data in the storage device.

2. An inspection apparatus for optical inspection of samples, the inspection apparatus comprising:
   an optical inspection device comprising a camera,
   a user interface comprising a display device, and
   the processing device of claim 1, the processing device being communicatively coupled to the user interface and the camera.

3. A method for performing optical quality inspection of samples, using an inspection apparatus,
   wherein the inspection apparatus comprises:
      an optical inspection device comprising a camera,
      a user interface comprising a display device, and
      the processing device of claim 1, the processing device being communicatively coupled to the user interface and the camera;
   the method comprising:
      viewing a sample using the camera of the optical inspection device and the display device,
      performing optical quality inspection of the sample according to the instructions displayed at the display device by:
         matching an overlay displayed on the display device with the sample being viewed, and
         determining quality characteristics based on differences between corresponding geometric measures of the overlay and the sample or a live image of the sample, and
      creating a quality report about the optical quality inspection performed and storing the quality report in the storage device, and/or acquiring images using the camera and storing the images in the storage device.

4. The method of claim 3, wherein the quality report includes a pass or fail note determined based on the quality characteristics.

5. A method for setting up an inspection apparatus for optical inspection of samples, wherein the inspection apparatus comprises:
   an optical inspection device comprising a camera,
   a user interface comprising a display device,
   a processing device, and
   a storage device,
   the method comprising:
      coupling the processing device communicatively to the user interface and the camera,
      coupling the processing device communicatively to the storage device,
      configuring the processing device to have access to the storage device to store and retrieve data,
      creating instruction data including instructions for optical quality inspection of samples to be performed by a user, and storing the instruction data in the storage device, wherein creating the instruction data comprises defining instructions for the user regarding what kind of quality inspection to be performed on which sample, which quality reports to be made, and which images to be acquired from the sample, wherein the creating the instruction data further comprises: defining at least one overlay to be displayed by the display device, such that the overlay is virtually overlaid to a sample currently inspected by the optical inspection device and/or viewed via the displays device, and the overlay to be used by the user to perform specific quality inspections on the sample by:
         matching a live image of the sample currently viewed to the overlay, and
         determining quality characteristics based on differences between corresponding geometric measures of the overlay and the live image of the sample,
      configuring the processing device to provide the instructions to a user upon request, and
      configuring the processing device to store quality report data and image data upon request during the providing of the instructions.

6. The method of claim 5, wherein the optical inspection device further comprises a microscope, and/or wherein the user interface comprises a touch display as the display device and/or an input device provided separately from the display device.

7. The method of claim 5, wherein the storage device comprises a folder based data storage and/or a database server.

8. A method for operating a processing device to be used in an inspection apparatus for optical inspection of samples, the processing device being configured to:

be communicatively coupled to a camera of an optical inspection device, be communicatively coupled to a user interface comprising display device, receive input data from the user interface and/or from the camera, provide output data to the user interface, and be communicatively coupled to a storage device and to access the storage device to store and retrieve data, the method comprising:

providing, by accessing instruction data stored at the storage device by the processing device, instructions for optical quality inspections of samples to be performed by a user, via the user interface device, providing the instructions as output data to the user interface, wherein the instructions include pre-defined instructions for the user regarding what kind of quality inspection to be performed on which sample, and at least one pre-defined overlay to be displayed by the display device, such that the overlay is virtually overlaid to a sample currently viewed by the optical inspection device and/or via the display device, and the overlay to be used by the user to perform specific quality inspections on the sample, controlling, by the processing device, the camera to acquire a live image of the sample currently viewed, controlling the display device to display the live image and the overlay such that the overlay is virtually overlaid to the live image, receiving, by the processing device, quality report data from the optical quality inspections via the user interface and/or image data of images acquired by the camera as input data, and storing the quality report data and/or the image data in the storage device.

9. A non-transitory computer-readable medium having program steps stored thereon, the program steps, when executed by the processing device, facilitating performance of the method of claim 8.

* * * * *